United States Patent
Zebuhr

(10) Patent No.: US 6,238,524 B1
(45) Date of Patent: May 29, 2001

(54) ROTATING PLATE HEAT EXCHANGER

(75) Inventor: William H. Zebuhr, Nashua, NH (US)

(73) Assignee: Ovation Products Corporation, Nashua, NH (US)

( * ) Notice: Subject to any disclaimer, the term of this patent is extended or adjusted under 35 U.S.C. 154(b) by 0 days.

(21) Appl. No.: 09/211,363

(22) Filed: Dec. 14, 1998

(51) Int. Cl.⁷ .............. B01D 1/26; B01D 3/00; B01D 3/02
(52) U.S. Cl. .......... 202/185.1; 202/172; 203/24; 159/6.1; 159/18; 165/88
(58) Field of Search ............... 159/28.6, 6.1, 159/18, 24.1; 165/165, 88, 166; 202/238, 172, 173, 174, 182, 185.1; 203/24, 26

(56) References Cited

U.S. PATENT DOCUMENTS

| | | | |
|---|---|---|---|
| 2,703,310 | 3/1955 | Kretchmar | 202/205 |
| 2,894,879 | 7/1959 | Hickman | 202/45 |
| 2,899,366 | 8/1959 | Hickman | 202/205 |
| 3,764,483 | 10/1973 | Tleimat | 202/236 |
| 3,890,205 | 6/1975 | Schnitzer | 202/236 |
| 4,125,946 | 11/1978 | Prager | 34/80 |
| 4,129,014 | 12/1978 | Chubb | 62/333 |
| 4,235,679 | 11/1980 | Swaidan | 202/234 |
| 4,267,021 | 5/1981 | Speros et al. | 202/176 |
| 4,402,793 | 9/1983 | Petrek et al. | 202/174 |
| 4,504,361 | 3/1985 | Tkac et al. | 202/172 |
| 4,585,523 | 4/1986 | Giddings | 202/236 |
| 4,586,985 | 5/1986 | Ciocca et al. | 202/174 |
| 4,671,856 | * 6/1987 | Sears | 203/22 |
| 4,707,220 | 11/1987 | Feres | 159/6.1 |
| 4,731,159 | * 3/1988 | Porter et al. | 159/6.1 |
| 5,045,155 | 9/1991 | Ramsland | 202/174 |
| 5,409,576 | * 4/1995 | Tleimat | 202/174 |
| 5,411,640 | 5/1995 | Ramsland | 202/174 |
| 5,628,879 | 5/1997 | Woodruff | 202/234 |
| 5,810,975 | 9/1998 | Bourdel et al. | 202/176 |

FOREIGN PATENT DOCUMENTS 757085    9/1956   (GB) .

\* cited by examiner

*Primary Examiner*—Shrive Beck
*Assistant Examiner*—Frederick Varcoe
(74) *Attorney, Agent, or Firm*—Cesari and McKenna, LLP

(57) ABSTRACT

The invention relates to an improved evaporator and condenser unit for use in distilling a liquid such as water. The evaporator and condenser unit includes a plurality of stacked, spaced-apart plates disposed within a housing. The plates are horizontally arranged around a common, vertical axis for rotation. Adjacent plates define spaces between their oppositely facing surfaces, which are alternating configured as evaporating and condensing chambers. An outlet tube transfers vapor generated within the housing to a compressor and an inlet tube delivers compressed vapor to central receiving space within the stack of plates. A sump containing the liquid to be distilled is located at a lower portion of the housing. Each plate includes a plurality of ports for distributing liquid to be distilled and for extracting a condensate. In particular, each plate includes at least one liquid feed port that provides a generally vertical liquid flow path through each evaporating chamber, by-passing the adjacent condensing chambers. A rotary scoop tube draws liquid from the sump and distributes it to each of the evaporating chambers. A condensate port within each plate provides a generally vertical condensate flow path through each condensing chamber, by-passing the evaporating chambers. The inner diameter ends of the condensing chambers are open to receive the compressed vapor and the outer diameter ends of the evaporating chambers are open to transfer vapor and remaining liquid to the housing. A stationary scoop tube removes condensate generated within the condensing chambers of the unit.

41 Claims, 7 Drawing Sheets

ROTATING PLATE HEAT EXCHANGER

BACKGROUND OF THE INVENTION

This invention relates to distillation systems and, more specifically, to an improved, highly efficient, rotary evaporator and condenser for use in a vapor compression distiller.

Distillation is a common method for generating potable water from otherwise unsafe water sources (such as sea water or polluted ground water). With distillation, water is heated to boiling and the corresponding vapor (i.e., steam) is collected and condensed, producing distilled water. Many contaminants that are present in the water source are left behind when the water is converted to its vapor phase. Conventional small distillers typically incorporate an electric heating element to boil water in a tank. A condensing coil mounted above the tank collects the vapor and condenses it. The distilled water is then transferred to a holding tank or cell. These boiler-type distillers, however, require substantial amounts of electrical power to produce relatively little distilled water and are thus highly inefficient. They are also extremely slow, often taking many hours to produce just a few gallons of distilled water. Accordingly, boiling-type distillers have not gained widespread acceptance or use.

In addition to boiler-type distillers, thin-film distillers have also been proposed. For example, U.S. Pat. No. 4,402,793 to Petrek et al. titled MULTIPLE EFFECT THIN FILM DISTILLATION SYSTEM AND PROCESS is directed to a solar-powered, thin film distiller. In the distiller of the '793 patent, a plurality of parallel, spaced-apart plates are arranged to face the sun. Water to be distilled is supplied to the tops of the plates and guided to run down the back face of each plate. Sunlight irradiating the first plate's front side heats the plate and causes a portion of the water running down the opposite side to evaporate. The vapor condenses along the front side of the next adjacent plate, transferring heat to the flow of water on its opposite side and so on. Condensate generated along the front sides of the plates is separately collected at the bottoms of the plates.

To improve the efficiency of thin-film distillers, rotary evaporators have also been designed. For example, U.S. Pat. No. 4,731,159 to Porter et al., entitled EVAPORATOR, is directed to a rotary type evaporator having a plurality of horizontally stacked annular plates that are disposed within a housing and mounted for rotation about a central shaft. The ends of alternating pairs of plates are sealed to define sealed spaces. Thus, each sealed space includes two inner plate surfaces facing each other and two outer surfaces, each of which is opposite a respective inner surface. The sealed spaces, moreover, are interconnected by a series of orifices and washers disposed between adjacent outer plate surfaces. A liquid to be distilled is introduced into the stack of rotating annular plates and enters each of the sealed spaces through an inlet port. As the liquid enters the spaces, it flows along the opposing inner surfaces of the space. A condensable vapor is introduced into the housing and is thus free to flow around the outer surfaces of the plates. The vapor is not, however, able to enter the sealed spaces. Since the liquid in the sealed spaces is at a lower temperature than the vapor, the vapor condenses along the outer surfaces of the plates. The condensate is thrown off of the rotating plates, collects inside the housing and is removed through an outlet port located in the bottom of the housing. Condensation of the vapor also transfers heat across the plates to the liquid, thereby causing a portion of the liquid in the sealed spaces to evaporate. The vapor exits the sealed spaces through the liquid inlet ports and is removed from the top of the housing. Any non-evaporated liquid remaining in the spaces flows upwardly along the sealed spaces through the corresponding orifice/washer arrangements and is also withdrawn from the top of the evaporator.

Although it may provide some advantages, the design of the '159 evaporator presents a substantial risk of contamination of the condensate by the liquid being evaporated and is thus not suitable to generating potable distilled water. In other words, with the evaporator of the '159 patent, the unsafe water which is being distilled is capable of mixing with and thus contaminating that distillate. More specifically, any leak at a sealed space would allow liquid from the sealed space to enter the housing and mix with the distillate being collected therein. The likelihood of such an occurrence, moreover, is not insignificant due to the corrosive attributes of some water sources and the high number of orifices and washers that are needed to provide fluid communication between the various sealed spaces.

Multiple-effect distillation systems are also known. U.S. Pat. No. 2,894,879 to Hickman entitled MULTIPLE EFFECT DISTILLATION discloses a distiller having fifteen vertically arranged effects. Each effect includes a rotating evaporator section and an associated condenser section. The liquid to be distilled is supplied to the evaporator section of the first stage, which is located at the top of the distiller. A heat source, such as steam, is similarly provided to the condenser section of the first effect, in order to evaporate at least a portion of the liquid. The vapor generated in the evaporator section of the first effect is then transferred to the second effect condenser section where it is used to heat liquid left over from the first effect that is likewise provided to the evaporator section of the second effect. The distillate generated within the condenser section of the first effect is also transferred to the condenser section of the second effect. This process is repeated at each effect of the distiller. The distillate accumulated from each of the effects is then removed from the system. To achieve the desired flow among the effects, the distiller of the '879 patent includes numerous rotating tubing segments that are used to interconnect the various evaporator and condenser sections and to spray liquid onto the surface of the evaporator sections. Accordingly, the manufacturing and assembly costs of the system are relatively high. Furthermore, any leaks of liquid in the evaporator sections will contaminate distillate being collected in the adjacent condenser sections. The existence of any such leaks, moreover, would be extremely difficult to detect.

Vapor compression distillers, which can be more efficient than conventional distillers, are also known. The underlying principle of vapor compression distillers is that, by raising the pressure of a vapor (e.g., steam), its saturation temperature also rises. In the vapor compression distiller, vapor produced in an evaporator is removed, compressed (raising its saturation temperature) and returned to the evaporator where it condenses, producing a distillate. Furthermore, the heat of vaporization that is given off as the vapor (having a raised saturation temperature) condenses is used to heat (and thus evaporate) the liquid being distilled. Large-scale vapor compression distillers using powerful censtrifugal compressors can produce hundreds of gallons of distilled water a day. These distillers, however, do not scale well. That is, for installations requiring only tens of gallons of distilled water a day, large-scale distillers are impractical, in part, due to the operating costs associated with the centrifugal compressor.

SUMMARY OF THE INVENTION

It is an object of the present invention to provide a rotary evaporator and condenser for use in a distiller.

It is a further object of the present invention to provide an evaporator and condenser that reduces the risk of contamination of the final condensate.

A further object of the present invention is to provide a multiple-effect evaporator and condenser unit.

A still further object of the present invention is to provide a multiple-effect evaporator and condenser that reduces the risk of contamination of the final condensate.

Briefly, the invention relates to an improved evaporator and condenser unit for use in distilling a liquid such as water. The evaporator and condenser unit includes a plurality of stacked, spaced-apart plates disposed within a housing. The plates are horizontally arranged around a common, vertical axis for rotation. Adjacent plates define spaces between their oppositely facing surfaces and the spaces are alternating configured as evaporating and condensing chambers. The unit further includes an outlet tube that transfers vapor generated within the housing to a compressor and an inlet tube that delivers compressed vapor to central receiving space within the stack of plates. A sump containing the liquid to be distilled is located at a lower portion of the housing. Each plate includes a plurality of ports for distributing liquid to be distilled and for extracting a condensate. In particular, each plate includes at least one liquid feed port disposed at a inner diameter position that provides a generally vertical liquid flow path through each evaporating chamber, by-passing the adjacent condensing chambers. A rotary scoop tube extends into the sump and is coupled to the lowest evaporating chamber at its liquid feed port. Each plate also includes at least one condensate port disposed at an outer diameter position that provides a generally vertical condensate flow path through each condensing chamber, by-passing the evaporating chambers. The inner diameter ends of the evaporating chambers, moreover, are sealed, while the inner diameter ends of the condensing chambers, are open to receive the compressed vapor. Similarly, the outer diameter ends of the evaporating chambers are open to the housing, while the outer diameter ends of the condensing chambers are sealed. A stationary scoop tube extends into a condensate collection area at the upper most condensing chamber.

In operation, the stack of plates are rotated causing the rotary scoop tube to draw liquid upwardly from the sump to the lowest evaporating chamber. The liquid is distributed along the liquid flow path from the lowest evaporating chamber upwardly through each of the remaining evaporating chambers. As liquid reaches each evaporating chamber, it is forced outwardly due to the centrifugal forces generated by the rotating plates. A restriction element at the entrance to each evaporating chamber forces the liquid to flow in sheet form along the oppositely facing surfaces of each evaporating chamber. As it flows along the plate surfaces, a portion of the liquid transforms to vapor, which enters the housing as the evaporating chambers are open at their outer diameter ends. The vapor is then drawn upwardly through the outlet tube and into the compressor. Any remaining liquid in the evaporating chambers is flung off of the corresponding plate surfaces, strikes the side walls of the housing and drops down into the sump. Compressed vapor is delivered by the inlet tube to the stack of rotating plates at the central receiving space. As the condensing chambers are open at their inner diameter ends, compressed vapor enters each condensing chamber. Compressed vapor condenses along the oppositely facing surfaces of the each condensing chamber and the condensate is forced to the outer ends of the condensing chambers which are sealed. The condensate from each condensing chamber flows upwardly through the stack of plates along the condensate flow path and is withdrawn from the housing by the stationary scoop. As compressed vapor condenses in the condensing chambers, the corresponding heat of vaporization is transferred through the plates to the adjacent evaporating chambers where it is used to vaporize liquid flowing along the other side of the plate which is located in the adjacent evaporating chamber.

In an alternative embodiment, the evaporator and condenser unit provides multiple condensing and evaporating effects. More specifically, a plurality of evaporator/condenser effects are preferably arranged in vertical stack. Each effect includes a plurality of stacked, spaced-apart plates such that adjacent plates define spaces between their oppositely facing surfaces and the spaces are alternating configured as evaporating and condensing chambers. An outlet tube transfers vapor in the housing to a compressor, where it is compressed and returned to a central receiving space associated with the first effect. A sump containing the liquid to be distilled is located at a lower portion of the housing proximate to the first effect. Each of the plates within a single effect includes at least one liquid feed port disposed at a inner diameter position that provides a generally vertical liquid flow path through each evaporating chamber and at least one condensate port disposed at an outer diameter position that provides a generally vertical condensate flow path through each condensing chamber. A rotary scoop tube extends into the sump from the liquid feed port at the first evaporating chamber of the first effect. The inner diameter ends of the evaporating chambers are sealed, while the inner diameter ends of the condensing chambers are open to receive compressed vapor. Similarly, the outer diameter ends of the evaporating chambers are open, while the outer diameter ends of the condensing chambers are sealed. Disposed between each effect is one or more transfer plates that includes at least one liquid transfer port and at least one condensate transfer port. The ports of the transfer plates are radially aligned but axially off-set from the respective ports of the adjacent effects so as to define an inner weir and an outer weir at the interfaces between each effect. The multiple-effect unit also includes an outer wall that is disposed between the outer edges of the plates and the housing side walls along all but the highest effect and an inner wall that is disposed between the inner edges of the plates and the axis of rotation along all but the lowest effect. At least one aperture is formed through the outer wall at each effect. A stationary scoop tube extends into a condensate collection area at the highest effect.

In operation, the flow of liquid, vapor, compressed vapor and condensate within each effect is generally the same as described above in connection with the single effect system. For example, rotation of the plates causes the first scoop to draw liquid upwardly from the sump along the liquid flow path within the first effect and thus to each of the corresponding evaporating chambers. Within the evaporating chambers, liquid flows along the opposing plate surfaces and a portion thereof evaporates. Excess liquid from the evaporating chambers of all but the highest effect, rather than entering the housing, instead collects inside of the outer wall where it forms an annular pool. A stream of liquid from the annular pool flows through the apertures, enters the housing and collects at the sump. The presence of this annular pool, however, blocks the vapor generated in the evaporating chambers from also flowing through the apertures and entering the housing. Liquid from the liquid flow path in the first effect also crosses the transfer plate and enters the liquid flow path in the next higher effect. At the transfer plate, however, the liquid must climb over the inner weir in order to reach the liquid flow path of the next higher effect. As a result, a column of liquid, having the same height as the weir is formed, blocking higher pressure vapor at the lower effects from simply flowing to the higher effects which are operating at lower vapor pressures. Instead, the vapor is conveyed inwardly along the transfer plate to the open inner diameter ends of the condensing chambers of the next highest effect. The vapor condenses in this next highest effect generating a condensate and transferring heat to the adjacent evaporating chambers. Additionally, the condensate generated within each effect flows upwardly along the condensate flow path and is similarly forced to climb over the outer weir formed at each transfer plate, blocking higher pressure vapor at the lower effects from flowing to the higher effects. This flow pattern is repeated at and between each effect up until the highest effect. At the highest effect, there is no outer wall. Therefore, the vapor generated in the corresponding evaporating chambers simply enters the housing and is transferred to the compressor, and any un-evaporated liquid simply falls back to the sump. At the highest effect, the condensate generated by each effect is withdrawn by the stationary scoop tube.

BRIEF DESCRIPTION OF THE DRAWINGS

The above and further advantages of the invention may be better understood by referring to the following description in conjunction with the accompanying drawings, in which.

DETAILED DESCRIPTION OF AN ILLUSTRATIVE EMBODIMENT

Figure 1:
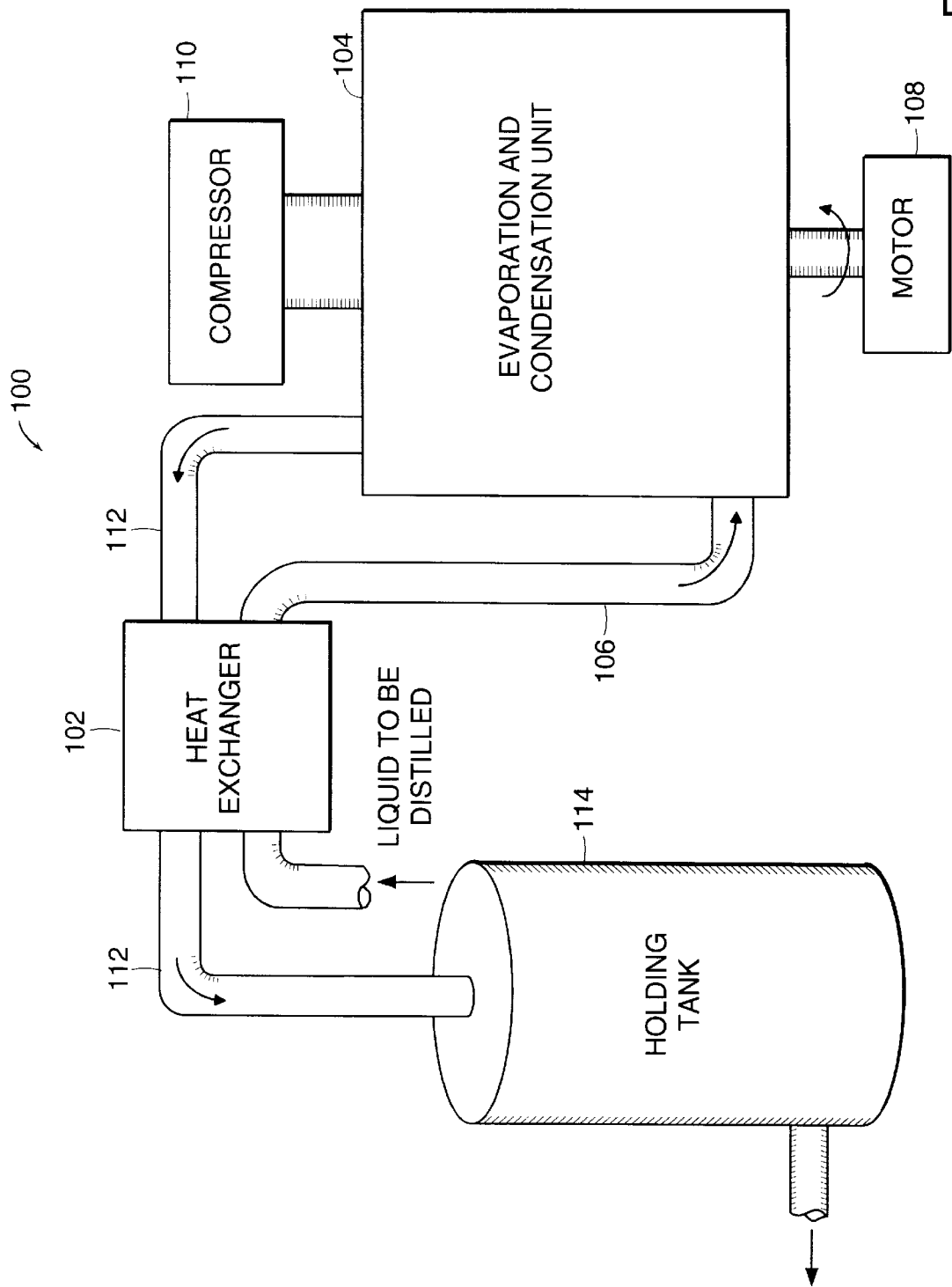
FIG. 1 is a highly schematic block diagram of a vapor compression distiller in accordance with the present invention.

FIG. 1 is a schematic diagram of a vapor compression distillation system 100 in accordance with the present invention. Generally, the system 100 comprises a heat exchanger 102 for heating a supply of liquid, such as non-potable water, to be distilled. Heated liquid is transferred to an evaporation and condensation unit 104 by a feed line 106. Coupled to the evaporation and condensation unit 104 are a motor 108 for supplying rotary power and a compressor 110, which receives vapor generated within unit 104, compresses it and returns it to unit 104. An output line 112 transfers a condensate, such as distilled water, through the heat exchanger 102 and into a holding tank 114.

Single-Effect System

Figure 2:
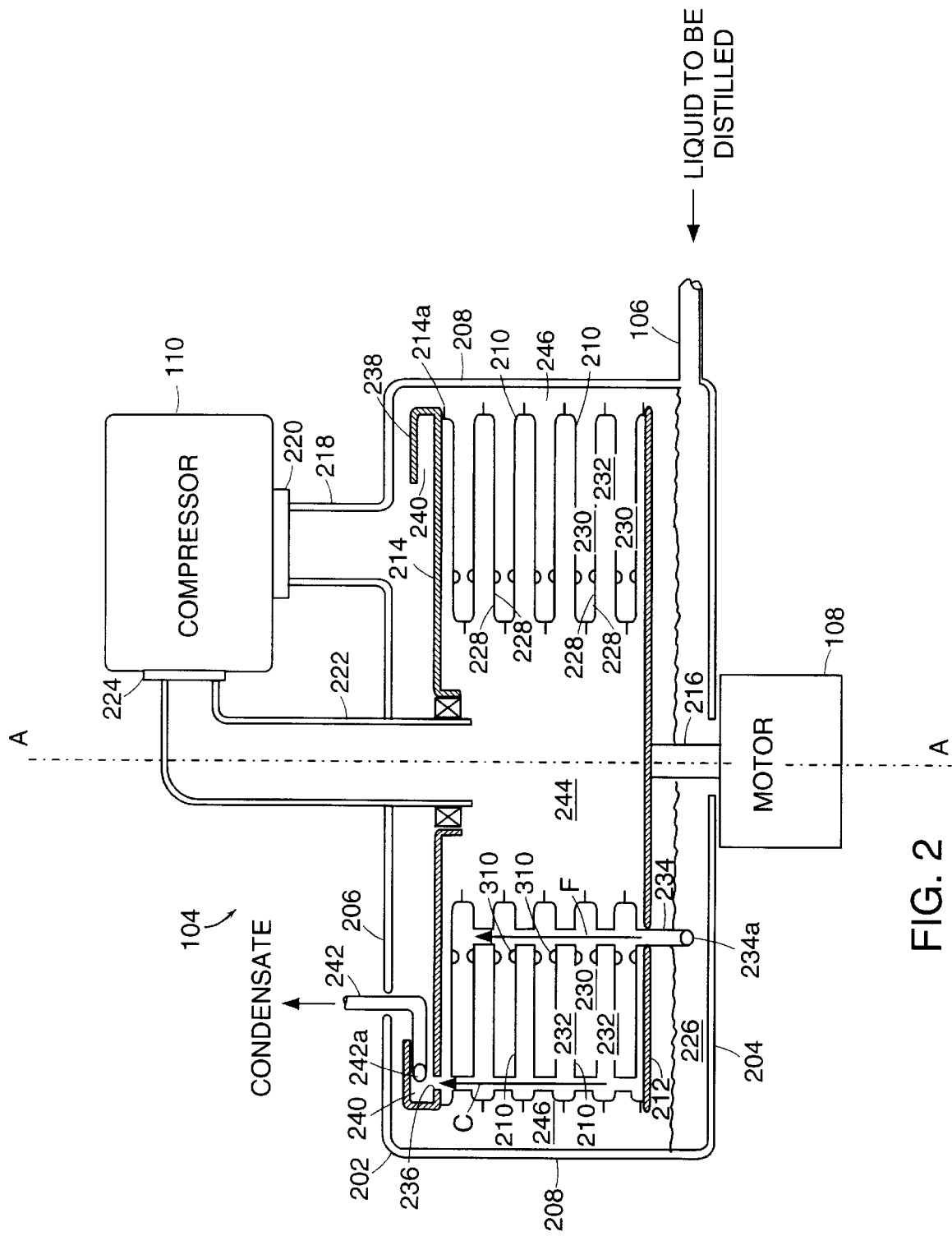
FIG. 2 is a cross-sectional plan view of a single-effect, rotary heat exchanger in accordance with the present invention.

FIG. 2 is a highly schematic, cross-sectional view of the evaporation and condensation unit 104 of FIG. 1 configured as a single effect system. The unit 104 includes a housing 202 having a bottom wall 204, a top wall 206 and side walls 208. Disposed within the housing 202 are a plurality of horizontally stacked heat-exchange plates 210 which form a heat exchanger. The plates 210 are preferably sandwiched between a bottom end 212 proximate to bottom wall 204 and a top end plate 214 proximate to top wall 206. The plates 210 are also aligned for rotation about a common, central axis A—A. A shaft 216 from motor 108 extends through the bottom wall 204 of housing 202 and engages the bottom end plate 212 which may include a rotary drive adapter (not shown) or otherwise be configured to receive shaft 216. A vapor outlet tube 218 couples the housing 202 preferably at its top wall 206 to an inlet port 220 of the compressor 110. A vapor inlet tube 222 similarly connects the housing 202 preferably at its top wall 206 to an outlet port 224 of the compressor 110. A sump 226 which receives a liquid to be distilled from feed line 106 is located at the bottom of the housing 202. Each plate 210 defines two surfaces 228, and the oppositely facing surfaces 228 of adjacent plates 210 define spaces therebetween. These spaces, moreover, are alternately configured as evaporating chambers 230 and condensing chambers 232.

Figure 3A:
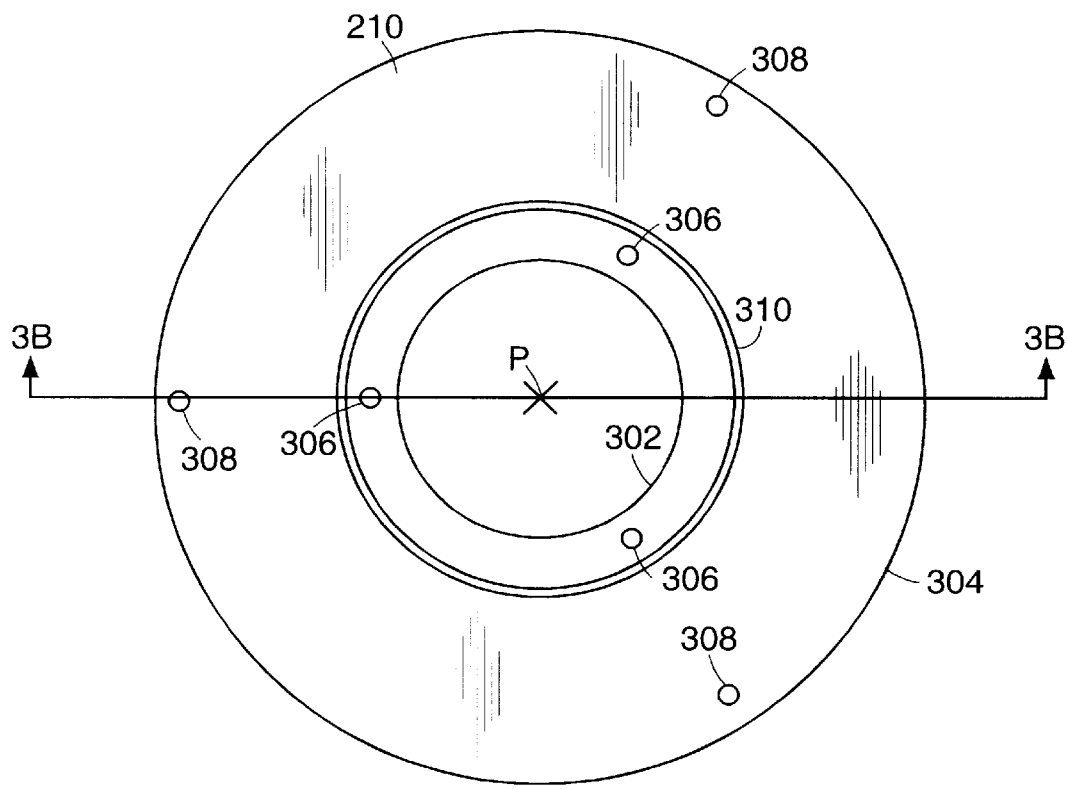
FIG. 3A is a top view of a heat exchanger plate.
Figure 3B:
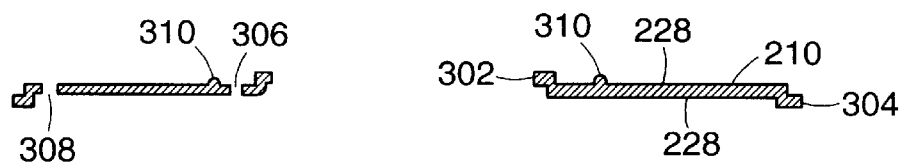
FIG. 3B is a side view of the plate of FIG. 3A along lines 3B—3B.

FIGS. 3A and 3B are top and side views, respectively, of a plate 210. Each plate 210 includes both an inner diameter edge 302 and an outer diameter edge 304 relative to a center point P which also corresponds to the axis of rotation A—A. Each plate 210 also includes a plurality of ports for distributing liquid to be distilled and for extracting a condensate from the unit 104, as described below. In particular, each plate 210 includes at least one liquid feed port 306 proximate to inner diameter edge 302 and at least one condensate port 308 proximate to outer diameter edge 304. In the preferred embodiment, each plate 310 includes three liquid feed ports 306 and three condensate ports 308. Each plate 210 further includes a restriction element 310 on one surface 228 thereof. The restriction element 310, which may be ring-shaped, is located slightly outboard of the liquid feed ports 306 relative to center point C and thus rotational axis A—A. The ring-shaped restriction element 310 preferably extends completely around the plate surface 228 at its respective radial location.

Returning to FIG. 2, the stacking arrangement of plates 210 within housing 202 establishes a generally vertical liquid flow path, designated generally by arrow F, along liquid feed ports 306 that provides fluid communication with each evaporating chamber 230, but by-passes the adjacent condensing chambers 232. The arrangement of plates 210 similarly establishes a generally vertical condensate flow path, designated generally by arrow C, along condensate ports 308 that provides fluid communication with each condensing chamber 232, but by-passes the evaporating chambers 230. Additionally, the inner diameter edges 302 of adjacent plates 210 forming each evaporating chamber 230 are sealed, while the inner diameter edges 302 of adjacent plates 210 forming each condensing chambers 232 are open to receive compressed vapor, as described below. Similarly, the outer diameter edges 304 of adjacent plates 210 forming each evaporating chamber 230 are open to the housing 202 to discharge vapor and liquid therein, while the outer diameter edges 304 of adjacent plates 210 forming each condensing chambers 232 are sealed.

A rotary scoop tube 234 having a scoop end 234a extends from a lowest evaporating chamber 230 in the stack through bottom end plate 212 and into the sump 226. In particular, rotary scoop tube 234 is coupled to the lowest evaporating chamber 230 at its liquid feed port 306. Top end plate 214 includes a condensate port 236 that is preferably axially aligned with the condensate ports 308 of the stack of plates 210. A flange 238 is preferably mounted to an outer edge 214a of top end plate 214 opposite to the stack of plates 210 so as to define a collection space 240 between flange 238 and top end plate 214 opposite the stack of plates 210 at the upper most condensing chamber 232. A stationary scoop tube 242 having a scoop end 242a extends through top wall 206 of housing 202 such that scoop end 242a is disposed in the collection space 240. The stack of plates 210 within housing 202 also defines a centrally located compressed vapor receiving space 244 inboard of the inner diameter edges 302 of plates 210 and a vapor collection space 246 between the outer edges 304 of plates 210 and the side walls 208 of housing 202.

In the preferred embodiment, plates 210 are formed from 0.008 inch copper sheet stock, although other materials having sufficiently high thermal conductivity, such as stainless steel, may also be used. The plates 210 also have an inside diameter of approximately three inches and an outside diameter of approximately ten inches. The liquid feed ports 306 and condensate ports 308 each have cross-sectional areas on the order of 0.1 to 0.5 square inches and are generally elliptically shaped with the major axis substantially circumferentially aligned, although other shapes, such as circular, may also be employed. Other plate dimensions may be used depending on the desired condensation flow rate of the distiller 100. The inner diameter edges 302 of evaporating chambers 230 and the outer diameter edges 304 of condensing chambers 232 are preferably welded or braised together so that the stack of plates 210 is essentially bellows-shaped. The width of the evaporating and condensing chambers 230, 232 may be on the order of 0.02 to 0.2 inches. Each plate surface 228, moreover, may include a plurality of raised dimples (not shown) which contact the opposing plate surface 228 and thereby maintain the desired spacing between adjacent plates 210.

A suitable compressor 110 for use with the present invention is disclosed in a copending U.S. Patent Application (Attorney Docket No. 98-01 -BZ), entitled A Reciprocating Low Pressure Ratio Compressor, filed the same day as and commonly owned with the present application and hereby incorporated by reference in its entirety. A suitable motor 108 for use with the present invention is a two or four pole electrical motor which may have an operating speed in the range of 1500–3600 rpm.

In operation, motor 108 is activated, thereby rotating shaft 216, which, in turn, rotates the stack of plates 210 within housing 202 at approximately 1000 rpm by using a conventional speed reducer (such as a belt or gear transmission). Liquid to be distilled, such as non-potable water, passes through heat exchanger 102, where it is heated approximately to the boiling point and flows through inlet pipe 106 to the sump 226 of the evaporation and condensation unit 104. Compressor 110 is also activated, thereby drawing any vapor from housing 202 through outlet tube 218 and into the compressor inlet 220. Compressed vapor is fed to the central receiving space 244 of the housing 202 through inlet tube 222. Rotation of the stack of plates 210 also causes the rotary scoop 234 to rotate through the sump 226. With the scoop end 234a below the surface of the sump 226 and open in the direction of rotation, rotation of the scoop 234 causes a column of liquid to be forced up the scoop 234, through bottom end plate 212 and into the lowest evaporation chamber 230 via its respective liquid feed port 306.

Figure 4:
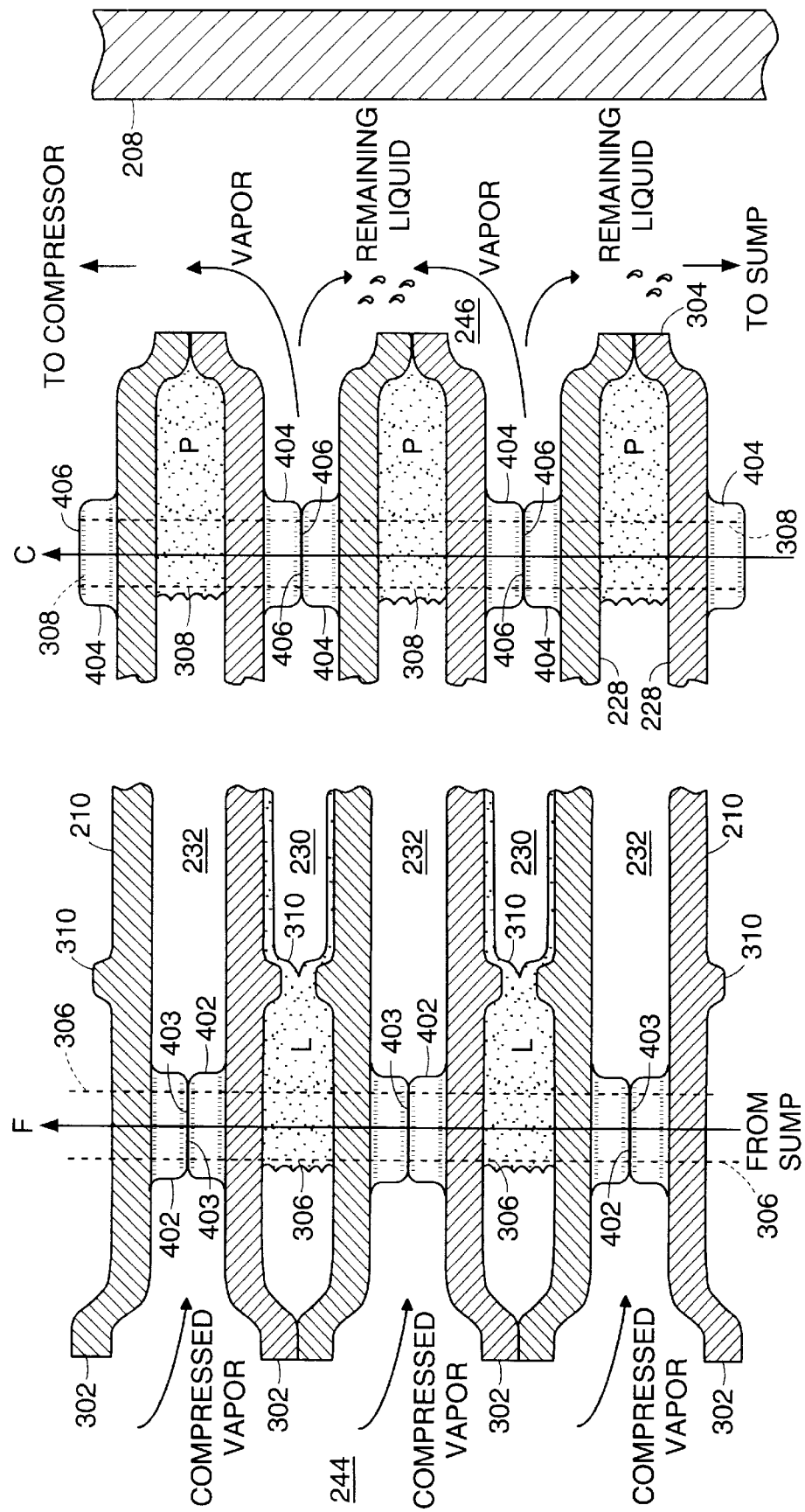
FIG. 4 is partial cross-sectional view of a series of plates the heat exchanger of FIG. 2.

FIG. 4 is an enlarged cross-sectional view of several stacked plates 210 illustrating the corresponding fluid flow patterns. As shown by arrow F, liquid from sump 226 is forced up through the liquid feed ports 306 within each plate 210 and enters each evaporating chamber 230. Due to the centrifugal forces generated within the rotating stack of plates 210, liquid is forced through the restriction element 310, where it is converted into sheets (as opposed to discrete streams) that flow along each of the oppositely facing plate surfaces 228 within the respective evaporating chamber 230. The restriction element 310 may also meter the flow of liquid through the respective evaporating chamber 230 such that liquid is received through port 306 faster than it flows through the respective evaporation chamber 230. Accordingly, an annular pool of liquid, designated L, forms within the entrance of the lowest evaporating chamber 230. Liquid continues to build up within the entrance, until the surface of the pool L reaches the outboard edge of the liquid feed port 306 relative to the axis of rotation A—A. When the height of the pool L reaches this point, additional liquid received in the evaporation chamber 230 will flow upwardly through the liquid feed port 306 and into the next highest evaporating chamber 230. Because liquid enters this next highest evaporating chamber 230 faster than it passes through the corresponding restriction element 310, another annular pool L is formed. This process is repeated at each evaporating chamber 232 within the stack of plates 210, thereby forcing liquid upwardly from the sump 226 along the liquid flow path F and into each evaporating chamber 230 where it forms a corresponding annular pool L.

To prevent liquid from the sump 226 from entering the condensing chambers 232 (and possibly contaminating the condensate being formed therein), each plate surface 228 within the condensing chambers 232 preferably includes a feed port flange 402 around the corresponding liquid feed port 306. Each feed port flange 402 includes a distal surface 403 configured such that, when the plates 210 are assembled in a vertical stack arrangement, the two distal surfaces 403 of opposing feed port flanges 402 within each condensing chamber 232 join to provide a fluid seal. Opposing distal surfaces 403 of adjacent feed port flanges 402 may be joined by welding, braising, soldering or other suitable techniques. Liquid flowing upwardly through the liquid flow path F is thus unable to enter the condensing chambers 232. Because liquid is intended to enter the evaporating chambers 230, flanges are not provided around the liquid feed ports 306 in the evaporating chambers 230.

In the preferred embodiment a feed tube (not shown) having an axial slot is inserted through ports 306 along the liquid feed flow path F such that the axial slot faces the axis of rotation A—A. Liquid from sump 226 climbs and fills the feed tube. As additional liquid is forced into the tube, the excess spills out of the open slot at each evaporating chamber 230, flows through the restriction element 310 and enters the evaporating chamber 230. The use of such a feed tube allows a much smaller column of water to formed at each restriction element 310.

After passing the restriction element 310, liquid flows, preferably in sheet form, along the opposing plate surfaces 228 within each evaporating chamber 230. As described below, heat from the adjacent condensing chambers 232 causes some portion of this liquid to evaporate and form a vapor. The presence of annular pools L forces the vapor to flow radially outward. Since the evaporating chambers 230 are open at their outboard ends, the vapor enters the housing 202 at the vapor collection space 246. Similarly, any remaining liquid that was not converted to vapor is flung off of the plate surfaces 228, strikes the side walls 208 of the housing 202 and drops down into the sump 226. Operation of the compressor 110 causes the vapor formed in the evaporating chambers 230 and discharged to the vapor collection space 246 to flow upwardly through the housing 202 and into the outlet tube 218. The vapor is then compressed within the compressor 110, which raises its temperature and pressure. Compressed vapor is returned to the housing 202 at the central receiving space 244 by inlet tube 222.

Compressed vapor enters the condensing chambers 232, which are open to the central receiving space 244 at their inboard edges. Since the liquid feed port flanges 402 only extend around the corresponding liquid feed ports 306, they do not block the flow of compressed vapor into the condensing chambers 232. As the liquid flowing along plate surfaces 228 in the adjacent evaporating chambers 230 is vaporizing at a lower temperature (e.g., 212° F.) than the compressed vapor (e.g., 214° F. saturation temperature), compressed vapor condenses along the opposing plate surfaces 228 within the condensing chambers 232. This condensate is forced to the outboard ends of the condensing chambers 232 by the centrifugal forces generated through rotation of the plates 210. Because the outboard ends of the condensing chambers 232 are closed, the condensate forms annular pools, generally designated P. As more and more vapor condenses within the condensing chambers 232, the surfaces of these pools P start to fill the condensate ports 308 beginning at the outboard edges thereof.

The condensate, which is constantly seeking out a lower level (relative to axis A—A), flows through the condensate port 236 at top end plate 214 and spills into the collection space 240. Here, condensate is removed by stationary scoop 242. More specifically, the build-up of condensate in the collection space 240 will eventually reach the scoop end 242a of the stationary scoop 242, at which point condensate will be forced into the scoop 242 and removed from the evaporating and condensing unit 104. By constantly removing condensate from the collection space 240, a flow pattern is established from the chambers 232 along the condensate flow path C and into the collection space 240. The scoop end 242a of scoop 242 is preferably disposed within collection space 240 so that condensate ports 308 remain full of condensate. The presence of condensate filing the condensate flow path C blocks higher pressure vapor in the condensing chambers 232 from simply flowing up through ports 308 and entering housing 202 which contains lower pressure vapor generated in the evaporating chambers 230.

To prevent condensate flowing along the condensate flow path C from entering the adjacent evaporating chambers 230, each plate surface 228 within the evaporating chambers 230 preferably includes a condensate port flange 404 around the corresponding condensate port 308. Each condensate port flange 404 also includes a distal surface 406 configured such that, when the plates 210 are assembled in a vertical stack arrangement, the two distal surfaces 406 of opposing condensate port flanges 404 within each evaporating chamber 230 are joined to provide a fluid seal. Opposing distal surfaces 406 of adjacent condensate port flanges 404 may similarly be welded, braised, soldered or otherwise joined using suitable techniques. Condensate flowing upwardly through the condensate flow path C is thus unable to enter the evaporating chambers 230. Because condensate is intended to enter the condensing chambers 232, flanges are not provided around the condensate ports 308 in the condensing chambers 232.

As shown, the fluid flow patterns established within the novel evaporation and condensation unit 104 of the present invention reduce the risk of contamination of the final condensate. First, condensate is preferably drawn out of the unit 104 near the top opposite the sump 226, thereby reducing the chance that liquid from the sump 226 will contaminate the condensate. Additionally, leaks in the condensing chambers 232 (e.g., due to improper sealing of their outboard edges) only result in condensate entering the housing 202 and falling down into the sump 226. Furthermore, because the liquid feed ports 306 are located outboard from the inner diameter edges of the evaporating chambers 230, liquid is unlikely to flow against the centrifugal forces and enter the central receiving space 244 even if an improper weld or braise were present.

In the preferred embodiment, a pressure differential of approximately 0.5 psi and a temperature differential of approximately 2° F. is established between the evaporating and condensing chambers 230, 232 during steady state operation of unit 104. This pressure differential, moreover, provides additional safeguards during generation of potable, distilled water. In particular, should a leak develop between adjacent chambers 230, 232, the pressure differential will cause condensate to enter the evaporating chamber 230 while preventing "dirty" liquid from entering the condensing chambers 232.

In the preferred embodiment, each restriction element 310 has a generally trapezoidal cross-section and opposing restriction elements 310 define a gap through which liquid flows. The gap is preferably on the order of 0.002–0.010 inches (preferably 0.003 inches) and may be a function of the width of the corresponding evaporating chambers 230. Nonetheless, it should be understood that the restriction element 310 may take alternative forms. For example, they may have semi-circular cross-sections. Alternatively, the restriction elements 310 may extend across the entire width of the corresponding evaporation chambers 230, but include a plurality of relatively wide passages therethrough so that liquid may enter the evaporation chambers 230.

It should also be understood that the system 100 preferably includes one or more de-gasser components (not shown) for removing air and other gases from the system 100.

Multiple-effect System

Figure 5:
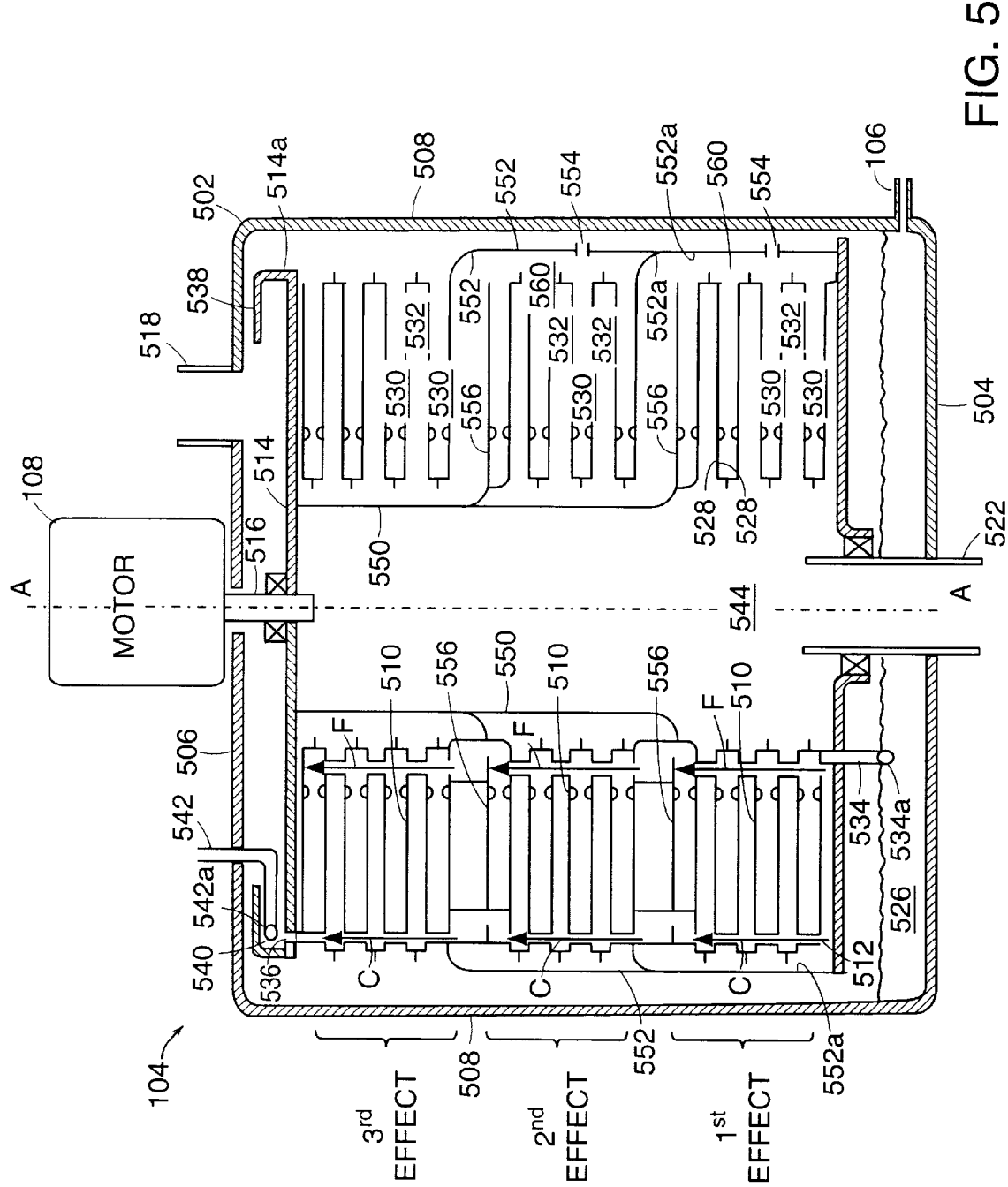
FIG. 5 is a partial cross-sectional plan view of a multiple-effect, rotary heat exchanger in accordance with the present invention.

FIG. 5 is a highly schematic, cross-sectional view the evaporation and condensation unit 104 of FIG. 1 configured as a multiple-effect system. The unit 104 includes a housing 502 having a bottom wall 504, a top wall 506 and side walls 508. Disposed within the housing 502 are a plurality of horizontally stacked, spaced-apart heat-exchange plates 510 arranged in a plurality of effects to form a heat exchanger. The plates 510 are preferably sandwiched between a bottom end plate 512 proximate to bottom wall 504 and a top end plate 514 proximate to top wall 506. The plates 510 are also aligned for rotation about a common, central axis A—A. A shaft 516 from motor 108, which in this embodiment may be mounted above the housing 502, extends through top wall 506 and engages the top end plate 514 which may include a rotary drive adapter (not shown). A vapor outlet tube 518 couples the housing 502 preferably at its top wall 506 to the compressor 110 (FIG. 1). The vapor outlet tube 518 is preferably centrally disposed to reduce the chances of liquid being conveyed to compressor 110 along with vapor. A vapor inlet tube 522 similarly connects the housing 502 preferably at its bottom wall 504 to the compressor 110. A sump 526 which receives a liquid to be distilled from feed line 106 is also located at the bottom of the housing 502. Inlet tube 522 extends through sump 526. Each plate 510 defines two surfaces 528, and the oppositely facing surfaces 528 of adjacent plates 510 define spaces therebetween. These spaces, moreover, are alternately configured within each effect as evaporating chambers 530 and condensing chambers 532.

Within each effect, plates 510 are substantially similar in design and configuration to plates 210 shown in FIGS. 3A and 3B. More specifically, each plate 510 includes both an inner diameter edge 302 and an outer diameter edge 304, at least one liquid feed port 306 proximate to inner diameter edge 302 and at least one condensate port 308 proximate to outer diameter edge 304. Each plate 510 further includes a restriction element 310 on one surface 528 thereof. The stacking arrangement of plates 510 within each effect establishes a generally vertical liquid flow path, F, along liquid feed ports 306 within each effect that provides fluid communication with each evaporating chamber 530, but bypasses the adjacent condensing chambers 532, and a generally vertical condensate flow path, C, along condensate ports 308 that provides fluid communication with each condensing chamber 532, but by-passes the evaporating chambers 530. Additionally, the inner diameter edges 302 of adjacent plates 510 forming each evaporating chamber 530 are sealed, while the inner diameter edges 302 of adjacent plates 510 forming each condensing chambers 532 are open to receive vapor, as described below. Similarly, the outer diameter edges 304 of adjacent plates 510 forming each evaporating chamber 530 are open, while the outer diameter edges 304 of adjacent plates 510 forming each condensing chamber 532 are sealed.

A rotary scoop tube 534 having a scoop end 534a extends from the liquid feed port 306 of the lowest evaporating chamber 530 within the first effect through bottom end plate 512 and into the sump 526. Top end plate 514 includes a condensate port 536 that is preferably axially aligned with the condensate ports 308 of the stack of plates 510. A flange 538 is preferably mounted to an outer edge 514a of top end plate 514 opposite to the stack of plates 510 so as to define a collection space 540. A stationary scoop tube 542 having a scoop end 542a extends through top wall 506 such that scoop end 242a is disposed in the collection space 540. The stack of plates 510 within housing 502 also defines a central, compressed vapor receiving space 544 inboard of the inner diameter edges 302 of plates 510.

An inner wall 550, which is generally disposed inboard of the inner diameter edges of plates 510 (relative to axis of rotation A—A), extends from the top end plate 514 to the upper most plate 510 of the first effect. Inner wall 550 essentially blocks compressed vapor in the central receiving space 544 from entering the condensing chambers 532 of all but the first effect, as described below. An outer wall 552, which is generally disposed outboard of the outer diameter edges of plates 510 (relative to the axis of rotation A—A), extends from the bottom end plate 512 to the lowest plate of the highest effect (e.g., the third effect). The outer wall 552, which includes an inner surface 552a, defines an enclosed space 560 inboard of the side wall 508 and essentially blocks vapor generated in the evaporating chambers 530 of all but the highest effect from entering the housing 502, as described below. A plurality of apertures 554 are provided in the outer wall 552 at each effect.

Between the plates 510 comprising each effect is at least one transition plate 556. That is, at least one transition plate 556 is disposed between the first and second effect, between the second and third effect and so on. As described below, the configuration of transition plates 556 and walls 550 and 552 causes vapor generated in the evaporating chambers 530 of a given effect (e.g., the first effect) to flow to the condensing chambers 532 of the next highest effect (e.g., the second effect). They also permit liquid to flow from the sump 526 to the evaporating chambers 530 of each effect and the condensate generated in the condensing chambers 532 of each effect to flow to the collection space 540 where it may be withdrawn by stationary scoop 542.

Figure 6A:
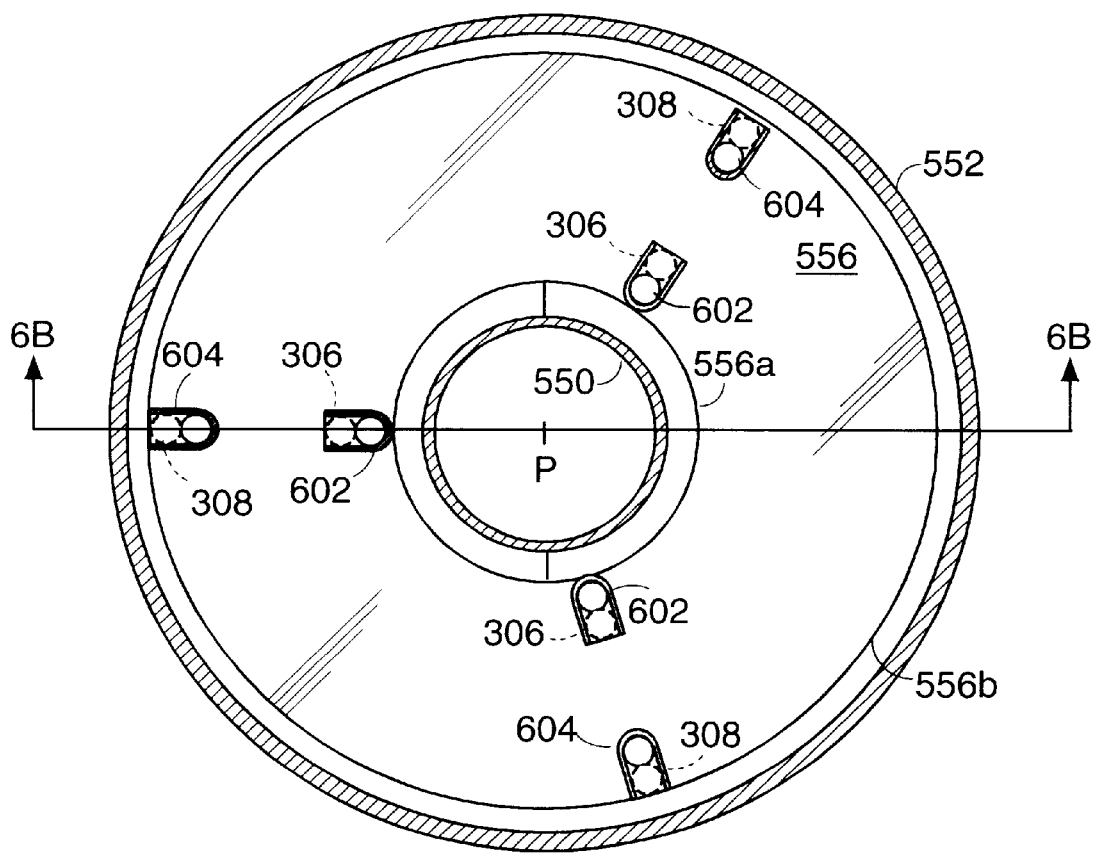
FIG. 6A is a top view of a transfer plate of the heat exchanger of FIG. 5.
Figure 6B:
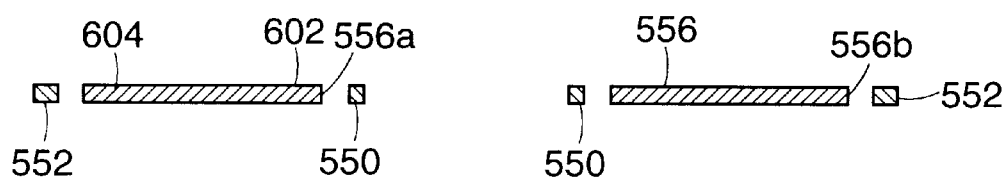
FIG. 6B is a side view of the transfer plate of FIG. 6A along lines 6B—6B.

FIGS. 6A and 6B are top and side views, respectively, of a transition plate 556. Each transition plate 556 includes both an inner diameter edge 556a and an outer diameter edge 556b relative to a center point P which also corresponds to the axis of rotation A—A. Each transition plate 556 also includes a plurality of ports for distributing liquid between adjacent effects and for conveying condensate between adjacent effects. In particular, each transition plate 556 includes at least one liquid transition port 602 proximate to inner diameter edge 556a and at least one condensate transition port 604 proximate to outer diameter edge 556b. The liquid transition port 602 and condensate transition port 604, however, are slightly off-set from the corresponding liquid feed ports 306 and condensate ports 308 of intra-effect plates 510. More specifically, the liquid transition ports 602 are disposed slightly inboard of the corresponding liquid feed ports 306 of plates 510. Similarly, the condensate transition ports 604 of the transition plates 556 are disposed slightly inboard of the corresponding condensate ports 308. Preferably, there is no overlap between transition ports 602, 604 and corresponding ports 306, 308.

In operation, motor 108 and compressor 110 are activated spinning the stack of plates 510 and withdrawing low pressure vapor from the housing 502 and returning higher pressure, higher temperature vapor to the central receiving space 544. Rotating scoop 534 draws liquid up from the sump 526 to the liquid feed port 306 of the lowest evaporation chamber 530 in the first effect. As described above in connection with the single effect system, liquid from sump 526 flows upwardly through the liquid feed channel F within the plates 510 of the first effect, thereby delivering liquid to each evaporation chamber 530 within the first effect. Compressed vapor from compressor 110 is delivered to central receiving space 544 and enters the condensing chambers 532 of the first effect which are open at their inner diameter edges to the central receiving space 544. Condensate forms along the plate surfaces 528 in the condensing chambers 532 transferring heat to the adjacent evaporating chambers 530. Vapor generated within the evaporating chambers 530 and any remaining liquid are discharged into the enclosed space 560 between the outer wall 552 and the outer diameter ends of the evaporating chambers 530 of the first effect.

Due to the centrifugal force generated within the rotating stack of plates 510, unevaporated liquid forms an annular pool against an inner surface 552a of the outer wall 552. A stream of liquid will bleed out of this annular pool through the apertures 554 in the outer wall 552 and fall down into the sump 526. The apertures 554 are preferably sized to permit an annular pool of liquid to remain inside of the outer wall 552. That is, apertures 544 are configured to remain full of liquid, thereby presenting a liquid barrier between the vapor in enclosed space 560 and the housing 502. Vapor thus flows upwardly to the transition plate 556 separating the first and second effects.

Figure 7:
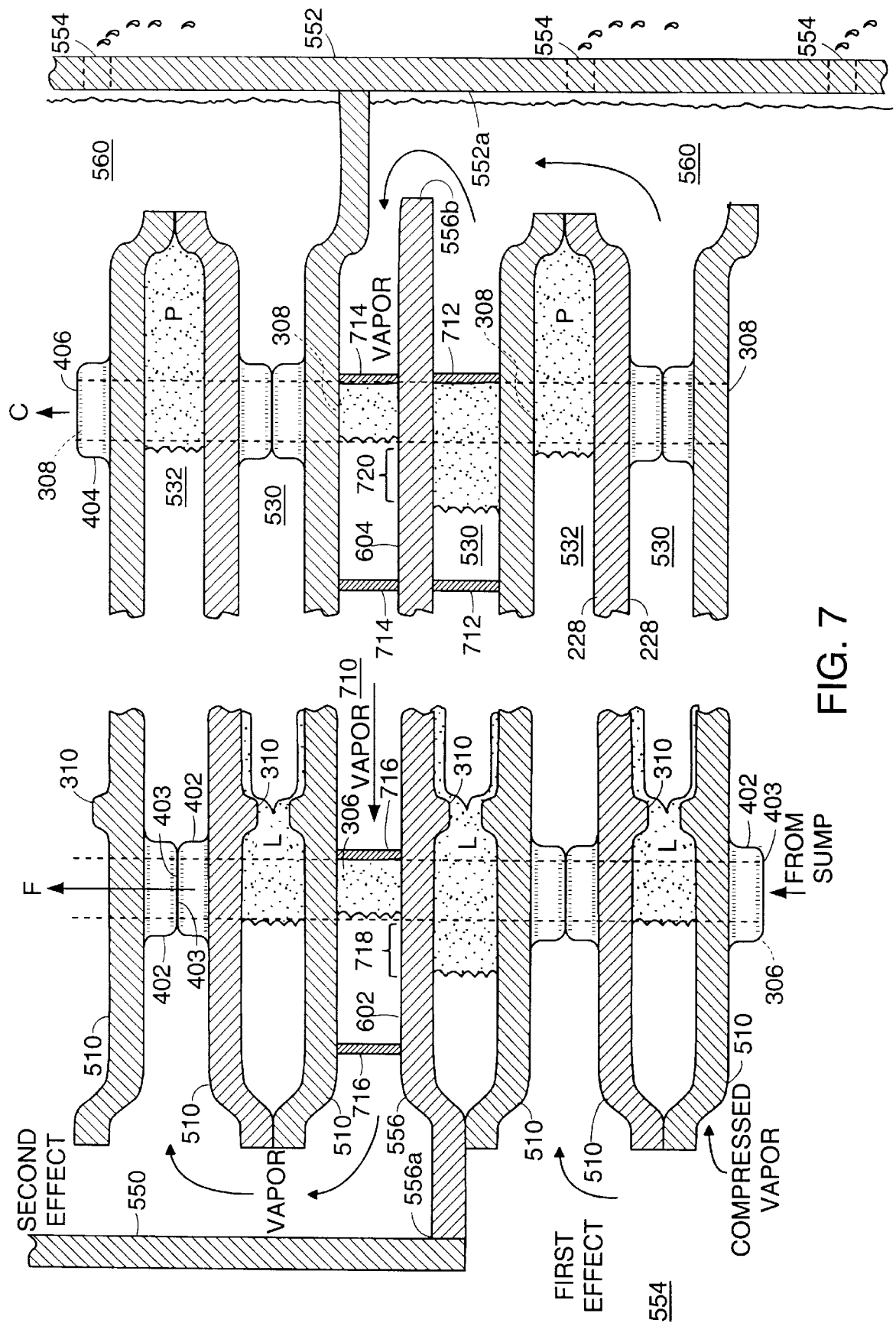
FIG. 7 is a cross-sectional plan view of the interface between two effects of the heat exchanger of FIG. 5.

FIG. 7 is a cross-sectional view of the interface between two effects (e.g., the first and second effects) of the multiple-effect system. As shown by arrow F, liquid from sump 526 is forced up through the liquid feed ports 306 within each plate 510 of the first effect and enters the corresponding evaporating chambers 530. An annular pool of liquid L also forms within the entrance of each evaporating chamber 530.

Plates 510 similarly include feed port flanges 402 around the liquid feed ports 306 and condensate port flanges 404 around the condensate ports 308 with correspondingly mating distal ends to prevent liquid from entering the condensing chambers 532 and condensate from entering the evaporating chambers 530. The vapor from evaporating chambers 530 flows around the outer edge 556b of the transition plate 556 which is preferably spaced from the outer wall 552 and into a transition space 710 defined by transition plate 556 and the first plate 510 of the next highest effect (e.g., the second effect). The vapor then flows inwardly along the transition space 710 to the inner diameter edges 302 of the condensing chambers 532 of the next highest effect. The inner diameter edge 556a of the transition plate 556 is preferably sealed against the inner wall 550 to prevent compressed vapor from the central receiving space 544 from flowing to the transition space 710. Instead, the vapor generated in evaporating chambers 530 of the first effect is forced to enter the condensing chambers 532 of the second effect.

Still considering the first effect, compressed vapor from central receiving space 544 enters the condensing chambers 532, condenses along the opposing plate surfaces 528 and is forced to the outboard ends of the chambers 532 by centrifugal force. The condensate forms annular pools, generally designated P, at the outboard ends of chambers 532 which are sealed. Condensate flows through the condensate ports 308 of plates 510 within the first effect toward the transition plate 556. At the transition plate 556, a first condensate sleeve 712 extends between transition plate 556 and the adjacent plate 510 in the first effect around off-set ports 604 and 308. First condensate sleeve 712 seals the condensate flow path C from the evaporating chamber 532 adjacent to transition plate 556. The first condensate sleeve 712 preferably extends only around the ports 604 and 308 and thus does not block the flow of vapor or liquid in the respective evaporating chamber 532. A second condensate sleeve 714 seals the condensate flow path C within the transition space 710. In particular, second condensate sleeve 714 extends between transition plate 556 and the adjacent plate 510 in the second effect and around off-set ports 604 and 308. A liquid feed sleeve 716 similarly seals the liquid feed flow path F between the transition plate 556 and the first plate 510 of the next effect. The liquid feed sleeve 716 preferably extends only around the off-set ports 602 and 306 so as to allow vapor from evaporating chambers 530 to flow along transition space 710.

As described above in connection with FIGS. 6A and 6B, liquid transition port 602 in transition plate 556 is axially off-set from the corresponding ports 306 in plates 510, thereby defining a liquid feed weir 718. Liquid flowing along the liquid feed flow path F within the first effect must "climb" over this weir 718 in order to reach the liquid feed flow path F within the second effect. The column of liquid corresponding to weir 718 presents a static head blocking vapor generated in the evaporating chambers 530 of the first effect from flowing along the liquid feed flow path F to the second effect. Liquid flows along the liquid feed flow path F within each effect, over the corresponding weir 718 at each transition plate 556 and into the liquid feed flow path F of the next highest effect. Liquid from sump 526 is thus distributed to the evaporating chambers 530 at each effect. Similarly, a condensate weir 720 is defined by the axially off-set arrangement between condensate transition port 604 and ports 308 in plates 510. Condensate flowing along the condensate flow path C in the first effect must "climb" over this weir 720 in order to reach the condensate flow path C in the second effect. The corresponding column of condensate presents a static head blocking any vapor in the condensing chambers 532 of the first effect from flowing along the condensate flow path C to the higher effects. Condensate thus flows along the condensate flow path C from the first effect up to the highest effect in the unit 104. At the highest effect, condensate flows through condensate poll 536 and accumulates in the collection space 240 where it is removed by stationary scoop 542. The end 242a of scoop 242 is again preferably positioned so that the condensate ports defining the condensate flow path C remain full of condensate.

It should be understood that the plate surfaces 228 within the evaporating chambers 230 are preferably made hydrophilic while the plate surfaces 228 in the condensing chambers 232 are made hydrophobic. Due to its rotational speed, moreover, the plate stack may be oriented in any direction.

It should be further understood that the evaporation and condensation unit 104 may alternatively be thermally driven. More specifically, liquid in the sump may be heated to generate vapor at the desired saturation temperature by sources, such as a stove top burner, solar energy, etc.

The foregoing description has been directed to specific embodiments of this invention. It will be apparent, however, that other variations and modifications may be made to the described embodiments, with the attainment of some or all of their advantages. For example, although the present invention has been described in connection with a system for generating potable water, other uses of the evaporation and condensation unit, such as separating two liquids, may be made. Therefore, it is the object of the appended claims to cover all such variations and modifications as come within the true spirit and scope of the invention.

What is claimed is:

1. An evaporator-and-condenser unit for use in a vapor compression distiller comprising:

A. a motor;
   B. a compressor having a compressor inlet and a compressor outlet;
   C. a heat exchanger coupled to the motor for rotation thereby about an axis of rotation and comprising:
      1. first and second end plates having respective inner faces; and
      2. a plate stack connected between the first and second end plates and including a plurality of spaced-apart heat-exchange plates, each heat-exchange plate having a center point and an axis that passes through the plate's center point and extends perpendicular to a nominal plane of the plate, the axes of the plates coaxially aligned with the axis of rotation, each heat-exchange plate having two plate surfaces and inner and outer edges with respect to the center point, the heat-exchange plates defining alternating evaporating and condensing chambers between their opposing plate surfaces such that the plate surfaces between which the condensing chambers are defined cooperate with the inner faces of the first and second end plates to define a generally closed interior condensation space in fluid communication with the compressor outlet, wherein:
         a) each pair of heat-exchange plates that defines a condensing chamber is sealed at those heat-exchange plates' outer edges and cooperates to form near their inner edges a liquid feed passage isolated from the condensing chamber that they define but cooperating with the evaporating chambers and the other liquid feed passages to form a liquid feed path by which feed liquid can be introduced into the evaporating chambers; and b) each pair of heat-exchange plates that defines an evaporating chamber is sealed at those heat-exchange plates' inner edges and cooperates to form near their outer edges a condensate passage isolated from the evaporating chamber that they define but cooperating with the condensing chambers and the other condensate passages to form a condensate flow path by which condensate can be withdrawn from the condensing chambers; and D. a side wall disposed circumferentially about the heat exchanger and forming with the plate surfaces between which the evaporating chambers are defined an evaporator space in fluid communication with the compressor inlet.

2. The evaporator and condenser unit of claim 1 further comprising a restriction element disposed in one or more evaporating chambers for distributing liquid received from the liquid feed path along the opposing plate surfaces of the respective evaporating chamber.

3. The evaporator and condenser unit of claim 2 wherein the restriction element comprises a pair of opposing protrusions extending from the plate surfaces of the evaporation chamber, the opposing protrusions defining a gap through which the feed liquid flows.

4. The evaporator and condenser unit of claim 3 wherein the restriction element is radially located outboard of the liquid feed passage relative to the axis of rotation and extends circumferentially around the evaporation chamber.

5. The evaporator and condenser unit of claim 2 wherein each pair of heat-exchange plates that defines a condensing chamber is open at those heat-exchange plates' inner edges to a central receiving space that is coupled to the compressor outlet by a first tube.

6. The evaporator and condenser unit of claim 5 wherein each pair of heat-exchange plates that defines an evaporating chamber is open at those heat-exchange plates' outer edges to a vapor receiving space that is coupled to the compressor inlet by a second tube.

7. The evaporator and condenser unit of claim 6 wherein the motor includes a shaft that is received at one of the first and second end plates.

8. The evaporator and condenser unit of claim 6 wherein the heat exchanger further comprises a sump disposed proximate to the second end plate opposite the plate stack, the sump containing a liquid to be distilled and in fluid communication with the liquid feed passages of the evaporating chambers.

9. The evaporator and condenser unit of claim 8 wherein the heat exchanger further comprises a rotary scoop tube extending from the liquid feed passage of at least one evaporating chamber, through the second end plate and into the sump, the rotary scoop tube having an end and being arranged upon rotation to convey liquid from the sump to the liquid feed passage at the at least one evaporating chamber.

10. The evaporator and condenser unit of claim 6 wherein the heat exchanger further comprises:
a flange cooperating with the first end plate to define a condensate collection space that is in fluid communication with the condensate feed passages of the condensing chambers; and
a stationary scoop tube extending into the condensate collection space, the stationary scoop tube having an end and being arranged to withdraw condensate from the condensate collection space.

11. The evaporator and condenser unit of claim 6 wherein each heat-exchange plate includes at least one condensate port proximate to its outer edge, the condensate ports of the plate stack cooperate to form the condensate passage through the condensing chambers.

12. The evaporator and condenser unit of claim 11 wherein each heat-exchange plate includes at least one liquid feed port proximate to its inner edge, the liquid feed ports of the plate stack cooperate to form the liquid feed passage through the evaporating chambers.

13. The evaporator and condenser unit of claim 12 wherein each heat-exchange plate includes a condensate port flange around its at least one condensate port in the respective evaporating chamber, each condensate port flange having a distal end such that the distal ends of opposing condensate port flanges of a given evaporating chamber are joined in sealing engagement.

14. The evaporator and condenser unit of claim 13 wherein each heat-exchange plate further includes a feed port flange around its at least one liquid feed port in the respective condensing chamber, each feed port flange having a distal end such that the distal ends of opposing feed port flanges in a given condensing chamber are joined in sealing engagement.

15. A heat exchanger for use in a distiller having a compressor, a side wall disposed circumferentially about the heat exchanger, and a motor coupled to the heat exchanger for rotation thereby about an axis of rotation, the compressor including a compressor inlet and a compressor outlet, the heat exchanger comprising:
A. first and second end plates having respective inner faces; and
B. a plate stack connected between the first and second end plates and including a plurality of spaced-apart heat-exchange plates, each heat-exchange plate having a center point and an axis that passes through the plate's center point and extends perpendicular to a nominal plane of the plate, the axes of the plates coaxially aligned with the axis of rotation, each heat-exchange plate having two plate surfaces and inner and outer edges with respect to the center point, the heat-exchange plates defining alternating evaporating and condensing chambers between their opposing plate surfaces such that the plate surfaces between which the condensing chambers are defined cooperate with the inner faces of the first and second end plates to define a generally closed interior condensation space in fluid communication with the compressor outlet, wherein:
1. each pair of heat-exchange plates that defines a condensing chamber is sealed at those heat-exchange plates' outer edges and cooperates to form near their inner edges a liquid feed passage isolated from the condensing chamber that they define but cooperating with the evaporating chambers and the other liquid feed passages to form a liquid feed path by which feed liquid can be introduced into the evaporating chambers; and
2. each pair of heat-exchange plates that defines an evaporating chamber is sealed at those heat-exchange plates' inner edges and cooperates to form near their outer edges a condensate passage isolated from the evaporating chamber that they define but cooperating with the condensing chambers and the other condensate passages to form a condensate flow path by which condensate can be withdrawn from the condensing chambers; and
3. the side wall forming with the plate surfaces between which the evaporating chambers are defined an evaporator space in fluid communication with the compressor inlet.

16. The heat exchanger of claim 15 further comprising a restriction element disposed in one or more evaporating chambers for distributing liquid received from the liquid flow path along the opposing plate surfaces of the respective evaporating chamber.

17. The heat exchanger of claim 16 wherein the restriction element comprises a pair of opposing protrusions extending from the plate surfaces of the respective evaporation chamber, the opposing protrusions defining a gap through which the feed liquid flows.

18. The heat exchanger of claim 17 wherein the restriction element is radially located outboard of the liquid feed passage relative to the axis of rotation and extends circumferentially around the evaporation chamber.

19. The heat exchanger of claim 16 wherein each pair of heat-exchange plates that defines a condensing chamber is open at those heat-exchange plates' inner edges to a central receiving space, the central receiving space capable of receiving compressed vapor from the compressor outlet.

20. The heat exchanger of claim 19 wherein each pair of heat-exchange plates that defines an evaporating chamber is open at those heat-exchange plates' outer edges to a vapor receiving space, the vapor receiving space capable of providing vapor to the compressor inlet.

21. The heat exchanger of claim 20 wherein the motor includes a shaft that is received at one of the first and second end plates.

22. The heat exchanger of claim 20 further comprising a sump disposed proximate to the second end plate opposite the plate stack, the sump containing a liquid to be distilled and in fluid communication with the liquid feed passages of the evaporating chambers.

23. The heat exchanger of claim 22 further comprising a rotary scoop tube extending from the liquid feed passage of at least one evaporating chamber, through the second end plate and into the sump, the rotary scoop tube having an end and being arranged upon rotation to convey liquid from the sump to the liquid feed passage at the at least one evaporating chamber.

24. The heat exchanger of claim 15 further comprises:
 a flange cooperating with the first end plate to define a condensate collection space that is in fluid communication with the condensate feed passages of the condensing chambers; and
 a stationary scoop tube extending into the condensate collection space, the stationary scoop tube having an end and being arranged to withdraw condensate from the condensate collection space.

25. The heat exchanger of claim 15 wherein each heat-exchange plate includes at least one condensate port proximate to its outer edge, the condensate ports of the plate stack cooperate to form the condensate passage through the condensing chambers.

26. The heat exchanger of claim 25 wherein each heat-exchange plate includes at least one liquid feed port proximate to its inner edge, the liquid feed ports of the plate stack cooperate to form the liquid feed passage through the evaporating chambers.

27. The heat exchanger of claim 26 wherein each heat-exchange plate includes a condensate port flange around its at least one condensate port in the respective evaporating chamber, each condensate port flange having a distal end such that the distal ends of opposing condensate port flanges of a given evaporating chamber are joined in sealing engagement.

28. The heat exchanger of claim 27 wherein each heat-exchange plate further includes a feed port flange around its at least one liquid feed port in the respective condensing chamber, each feed port flange having a distal end such that the distal ends of opposing feed port flanges in a given condensing chamber are joined in sealing engagement.

29. A multiple-effect heat exchanger for use in a distiller having a compressor, a side wall disposed circumferentially about the heat exchanger, and a motor coupled to the heat exchanger for rotation thereby about an axis of rotation, the compressor including a compressor inlet and a compressor outlet, the heat exchanger comprising:

first and second end plates having respective inner faces;
 a plurality of effects, including a first and a last effect, disposed between the first and second end plates, each effect comprising:
  a plate stack including a plurality of spaced-apart heat-exchange plates, each heat-exchange plate having a center point and an axis that passes through the plate's center point and extends perpendicular to a nominal plane of the plate, the axes of the plates coaxially aligned with the axis of rotation, each heat-exchange plate having two plate surfaces and inner and outer edges with respect to the center point, the heat-exchange plates defining alternating evaporating and condensing chambers between their opposing plate surfaces such that the plate surfaces between which the condensing chambers are defined cooperate with the inner faces of the first and second end plates to define a generally closed interior condensation space in fluid communication with the compressor outlet;
 an inner wall mounted to the first end plate inboard of the inner edges of the plates relative to the axis of rotation and extending along all but the first effect;
 an outer wall mounted to the second end plate between the outer edges of the plates and the side walls of the housing and extending along all but the last effect; and
 at least one transition plate disposed between each pair of adjacent plate stacks; wherein
  1. each pair of heat-exchange plates that defines a condensing chamber is sealed at those heat-exchange plates' outer edges and cooperates to form near their inner edges a liquid feed passage isolated from the condensing chamber that they define but cooperating with the evaporating chambers and the other liquid feed passages to form a liquid feed path by which feed liquid can be introduced into the evaporating chambers;
  2. each pair of heat-exchange plates that defines an evaporating chamber is sealed at those heat-exchange plates' inner edges and cooperates to form near their outer edges a condensate passage isolated from the evaporating chamber that they define but cooperating with the condensing chambers and the other condensate passages to form a condensate flow path by which condensate can be withdrawn from the condensing chambers;
  3. each transition plate cooperates to form near their inner and outer edges corresponding first and second weirs, the first weir isolating the respective evaporating chambers and the second weir isolating the respective condensing chambers of the adjacent effect;
  4. the inner and outer walls cooperate with each transition plate to form a corresponding transition space providing fluid communication between the evaporating chambers of a first effect and the condensing chambers of a next highest effect; and 5. the side wall forming with the plate surfaces between which the evaporating chambers are defined at the last effect an evaporator space in fluid communication with the compressor inlet.

30. The multiple-effect heat exchanger of claim 29 further comprising a restriction element disposed in one or more evaporating chambers for distributing liquid received from the liquid feed path along the opposing plate surfaces of the respective evaporating chamber.

31. The multiple-effect heat exchanger of claim 30 wherein the restriction element comprises a pair of opposing protrusions extending from the plate surfaces of the respective evaporation chamber, the opposing protrusions defining a gap through which the feed liquid flows.

32. The multiple-effect heat exchanger of claim 31 wherein the restriction element is radially located outboard of the liquid feed passage relative to the axis of rotation and extends circumferentially around the evaporation chamber.

33. The multiple-effect heat exchanger of claim 30 further comprising a sump disposed proximate to the second end plate opposite the plate stack, the sump containing a liquid to be distilled and in fluid communication with the liquid feed passages of the evaporating chambers.

34. The multiple-effect heat exchanger of claim 33 further comprising a rotary scoop tube extending from the liquid feed passage of at least one evaporating chamber through the second end plate and into the sump, the rotary scoop tube having an end and being arranged upon rotation to convey liquid from the sump to the liquid feed passage at the least one evaporating chamber.

35. The multiple-effect heat exchanger of claim 34 further comprising:

a flange cooperating with the first end plate to define a condensate collection space that is in fluid communication with the condensate feed passages of the condensing chambers; and a stationary scoop tube extending into the condensate collection space, the stationary scoop tube having an end and being arranged to withdraw condensate from the condensate collection space.

36. The multiple-effect heat exchanger of 35 wherein each heat-exchange plate includes at least one condensate port proximate to its outer edge, the condensate ports of the plate stack cooperate to form the condensate passage through the condensing chambers.

37. The multiple-effect heat exchanger of claim 36 wherein each heat-exchange plate includes at least one liquid feed port proximate to its inner edge, the liquid feed ports of the plate stack cooperate to form the liquid feed passage through the evaporating chambers.

38. The multiple-effect heat exchanger of claim 37 wherein each heat-exchange plate includes a condensate port flange around its at least one condensate port in the respective evaporating chamber, each condensate port flange having a distal end such that the distal ends of opposing condensate port flanges of a given evaporating chamber are joined in sealing engagement.

39. The multiple-effect heat exchanger of claim 38 wherein each heat-exchange plate further includes a feed port flange around its at least one liquid feed port in the respective condensing chamber, each feed port flange having a distal end such that the distal ends of opposing feed port flanges in a given condensing chamber are joined in sealing engagement.

40. The multiple-effect heat exchanger of claim 33 wherein the outer wall has a plurality of apertures providing fluid communication between the evaporating chambers and the sump.

41. The multiple-effect heat exchanger of claim 40 wherein the outer wall has an inner surface relative to outer edges of the heat-exchange plates and further wherein the plurality of apertures are sized so as to cause an annular pool of condensate to form on the inner surface of the outer wall, the annular pool presenting a vapor barrier to the flow of vapor through the plurality of apertures.

* * * * *